March 2, 1943.  F. TERDINA, JR  2,312,603
AIRFOIL CONSTRUCTION
Filed Aug. 18, 1941
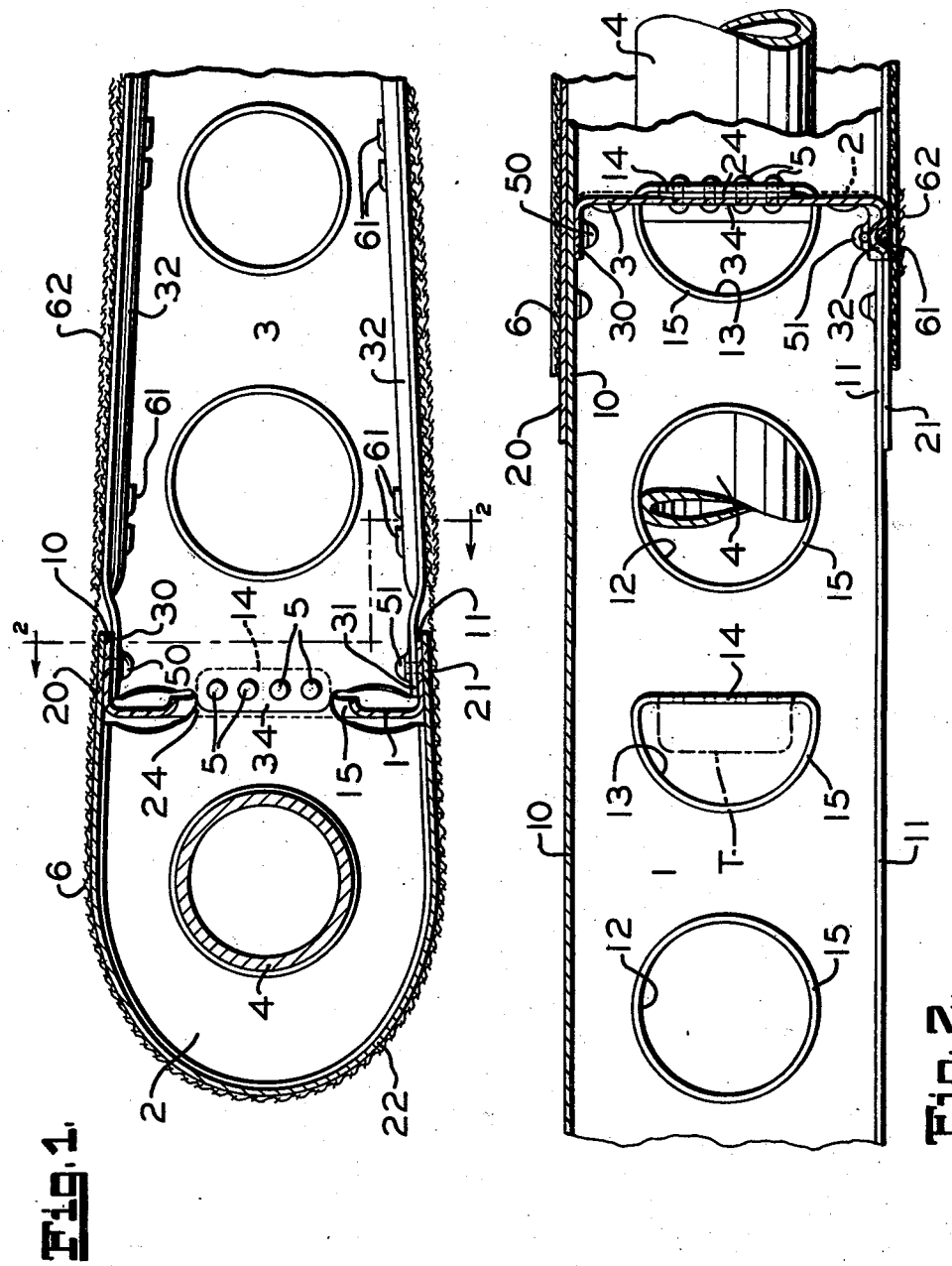
Inventor
Frank Terdina, Jr.
By Reynolds+Beach
Attorneys Patented Mar. 2, 1943

2,312,603

UNITED STATES PATENT OFFICE 2,312,603

AIRFOIL CONSTRUCTION

Frank Terdina, Jr., Seattle, Wash., assignor to Boeing Aircraft Company, Seattle, Wash., a corporation of Washington Application August 18, 1941, Serial No. 407,285

5 Claims. (Cl. 244—123)

The present invention relates to the construction of airfoils. While it is primarily intended for the construction of such airfoils as ailerons, flaps, and movable control surfaces generally, it is not outside the contemplation of the present invention to construct sustaining airfoils, as wings, or fixed control surfaces, by the use of the principles of this invention, analogous to the construction of such airfoils in accordance with the invention of R. J. Minshall, Patent No. 2,087,626.

As was pointed out in the patent referred to, the construction of airfoils of the type indicated, and especially if they be of thin section, is tedious because of the difficulty of reaching within the airfoil with a proper bucking tool to buck up the rivets, or to apply with any accuracy the electrodes of a spot welder. Especially is this true in the conventional construction wherein a complete skeleton consisting of ribs assembled upon spars or torque tubes is first constructed, and the whole is then covered with a skin. If fabric covering can be used, the difficulties are lessened, but even with airfoils such as control surfaces and the like, it is usually preferable to surround at least the nose of the airfoil with a sheet metal skin. Since the space within the nose section is crowded at best, and access is obstructed by the spar or torque tube whereon the ribs are assembled, it is a tedious and difficult task, and time-consuming, to apply such a skin upon the assembled skeleton.

It is a primary object of the present invention to provide a construction whereby such airfoils can be assembled quickly and easily, with all parts fully accessible for riveting or for spot welding, and in such a way that the final assembly can be accomplished quickly and easily, and the entire structure is strong and rigid.

Secondary objects thus attained are the material lessening of the cost of such airfoils, the material increase in the rapidity with which they can be assembled and completed, and the improvement in workmanship due to greater accessibility during the processes of assembly and sub-assembly.

Still a further object is the lessening of the weight of the airfoil as a whole, arising from the elimination of attached and separate attaching clips, and from the employment of integral flanged elements for attaching parts which meet at an angle, instead of extra angle sections.

With these and other objects in mind, as will appear as this specification progresses, my invention comprises the novel assembly and arrangement of the airfoil as a whole, and of the several parts thereof with relation to one another, all as shown in the accompanying drawing, described in this specification, and as will be more particularly defined by the claims which terminate the same.

In the accompanying drawing a typical assembly has been shown, but it will be remembered that the principles of the invention may be embodied in varying forms.

Figure 1 is a vertical fore and aft section through the nose portion of such an airfoil, illustrating parts in the final assembled position.

Figure 2 is a section substantially on the line 2—2 of Figure 1, looking forwardly.

The basis of the assembly is a spar 1, which is preferably stamped and formed from sheet metal, and which preferably is formed with rearwardly directed flanges 10 and 11, at top and bottom, respectively, which serve both as stiffeners and for attachment of other elements. In its web portion the spar is formed at intervals with lightening holes 12 and 13, as is customary, but the lightening holes 13 differ from the normal lightening holes 12 in that they are provided with one straight vertical side, and the metal initially lying within this lightening hole, or a part thereof, as indicated at T, is struck up in the forming to define a rearwardly directed tab 14. The lightening holes may also be flanged, as indicated generally at 15, for stiffness and rigidity.

The essence of the construction of the spar member 1 is that it is formed with all elements which are intended for the attachment of other elements, projecting rearwardly, and that some of these elements extend vertically and others extend horizontally. It is preferred that the entire spar (or appropriate unit lengths thereof), with these attaching elements, be formed of one piece, so that it is capable of being formed in a single forming operation, and the attachment of separate clips becomes unnecessary.

A nose section is separately constructed, and consists of nose rib sections 2 spaced to correspond to the spacing of the tabs 14, and each terminating in a rearwardly directed tab 24 which matches with the corresponding tab 14. These ribs may be mounted upon or associated with a torque tube 4, and in the construction shown they are surrounded by a metal skin 22, which completely encircles the outer margins of the ribs 2, and extends rearwardly at least to and preferably beyond the plane of the spar 1. The rearward skin extensions 20 and 21, as shown in Figure 1, extend past and outside of the spar to lie in contact with the rearwardly extended flanges 10 and 11, respectively, of the spar. This entire nose structure, preformed as a subassembly, has all its parts relatively accessible, since it is completely open at its rear end, and is not of such depth from front to rear that all parts cannot be conveniently reached through the open rear end for such operations as bucking-up rivets or applying the electrodes of a spot welder.

To the rear of the spar 1 the internal structure is completed by tail rib sections 3. These extend from the rear face of the spar 1 rearwardly to whatever extent is desirable, usually to the trailing edge of the airfoil, and at this trailing edge, or at some point intermediate between the same and the spar, stay members or stiffeners would normally be employed connecting these tail rib sections 3. Such elements have not been shown, as they do not, of themselves, constitute an essential part of this invention. Indeed, in some airfoils, such elements may take the form of rear spars, similarly formed and assembled. Several such spars might be used, creating a multicellular air foil. However, for present purposes, it is only important that, at their forward ends, these tail rib sections 3 are provided with forwardly extending tabs 34, which match with the tabs 14.

The tail rib sections 3 are flanged, as indicated at 30 and 31, adjacent the flanges 10 and 11, respectively, of the spar, and these flange sections 30 and 31 are intended to lie closely in contact with the spar flanges 10 and 11, respectively. The rib sections 3 may also be flanged, at the rear of the flanges 30 and 31, as indicated at 32, these flanges 32 being channeled, in the embodiment shown, for the reception of fabric clips.

The spar 1, the nose rib sections 2, and the tail rib sections 3 may all be formed complete as independent stampings by a comparatively simple operation. The nose structure is easily assembled, notwithstanding the metallic skin 22, as has already been explained. With these preliminary operations complete final assembly is in order, and is accomplished by fitting the preformed nose structure upon the spar 1, with the tabs 24 projecting through the lightening holes 13 into contact with the corresponding tabs 14, and by applying the tail rib sections 3 with their tabs 34 also engaging the corresponding tabs 14. All three tabs at any one rib station lie in close contact. The structure is all accessible for riveting, from the rear of the spar, since there is no skin upon the tail portion during this operation. Rivets 5 constitute a common means for securing all the tabs together, or they can be joined by equivalent spot welds. Similarly, when the parts are thus assembled, the flanges 10, 20 and 30, and 11, 21 and 31, respectively, lie in engagement, though they occupy planes which are at right angles to the vertical plane of the tabs. In this position they, too, may be readily secured together by common securing means such as the rivets 50 and 51, or equivalent means. The structure thus formed is light, yet strong and rigid, and the work is easily accomplished and the workmanship readily inspected.

The air foil may be completed by installing such stay members as are necessary adjacent the tail end of the tail rib sections 3, and by applying a covering over at least the portion to the rear of the spar. Conveniently a fabric covering is employed, the fabric sheet 6 extending from an anchorage at the rear of the airfoil, normally from the trailing edge, forwardly over one side, as the top, thence around the nose and over the skin 22, and finally back the opposite side, the bottom of the airfoil, to an anchorage, as before. Again, this anchorage would normally be at the trailing edge. The fabric is suitably secured in place, as, for instance, by the fabric clips 61, and a finishing strip 62 may be applied over the clips, and the whole fabric is usually doped in place, as is customary practice.

What I claim as my invention is:

1. A construction for airfoils and similar structure, comprising a longitudinal stiffener formed of sheet material, disposed in an upright plane, having spaced apertures flanged to define integral upright tabs outstanding from the plane of said longitudinal stiffener, a series of transverse upright formers of sheet material, of a size and shape to define the air foil contour at one side of said longitudinal stiffener, a separate series of transverse upright formers of sheet material, each of a size and shape to define the airfoil contour at the opposite side of said longitudinal stiffener, each of said first and said second formers having an integral tab shaped and disposed, when its former is end-abutted against the stiffener, for contiguous registry with the corresponding stiffener tab at one side of the stiffener's plane, and means common to all tabs of each set which is in registry, for securing them together.

2. A construction for airfoils and similar structures, comprising a continuous spar having spaced tabs projecting laterally therefrom, in planes substantially perpendicular to its length, and all to one side of said spar, and said spar having an aperture through it alongside each such tab, a set of rib sections at the side of said spar opposite its tabs, each rib section having a tab substantially coplanar therewith and projecting through a spar aperture into a position alongside the adjacent spar tab and in registry therewith, a stiff skin covering the rib sections of said set and interconnecting said sections, a set of complemental rib sections located at the side of said spar from which its tabs project, each such rib section having a tab substantially coplanar therewith disposed alongside and in registry with a spar tab, and shear means interconnecting each spar tab with the two tabs of the complemental rib sections disposed alongside it.

3. A hollow trussed structure, comprising a continuous upright stiffener of sheet material, a series of upright contour formers of sheet material secured to and extending outwardly from one side of said stiffener, and a similar series of upright contour formers of sheet material, complemental to those of the first series, secured to and extending outwardly from the opposite side of said stiffener, said stiffener having flanges at top and at bottom, and at least one of the series of contour formers having complemental top and bottom flanges secured to those of the stiffener, a relatively rigid skin secured to the other series of formers, and extending past the plane of the stiffener and being secured to its flanges at top and at bottom to constitute a relatively rigid assembly, the stiffener having holes at the plane of each former, an integral upright tab outstanding from an edge of each such hole, the corresponding formers, of both series, having integral tabs formed and positioned to register with the stiffener's tab, when the formers are operatively assembled relative to the stiffener, and means common to all said tabs to secure the parts in such operative assembly.

4. An air foil construction comprising a spar formed of sheet material, having spaced apertures rearwardly flanged to define integral upright tabs, nose rib sections formed of sheet material, of a size and shape to define the nose structure ahead of the spar, and each having an integral tab extending behind the spar and registering with the spar's tab, a stiff nose skin extending from the upper edge of the spar around the nose ribs and back to the lower edge of the spar, and secured to said nose ribs to constitute a relatively rigid nose subassembly, tail rib sections of sheet material each corresponding to a nose rib section, and each having an integral tab at its forward edge registering with the spar's tab and with the nose rib's tab, and a common means securing all three such registering tabs together, to the rear of the spar.

5. An airfoil construction comprising a spar formed of sheet material, having integral rearwardly directed flanges at top and bottom, and having spaced apertures rearwardly flanged to define integral upright tabs; nose rib sections formed of sheet material, of a size and shape to define the nose structure ahead of the spar, and each having an integral tab extending behind the spar and registering with the spar's tab; a nose skin extending from the spar's plane at top, around the nose and back to the spar's plane at bottom, and extending further rearwardly at top and bottom to register with the spar's flanges; said nose skin being secured to the nose ribs to constitute a nose subassembly; tail rib sections of sheet material each corresponding to a nose rib section, and each having an integral tab at its forward edge registering with the nose rib's tab, and each having also integral flanges at top and at bottom registering with the spar's flanges; a common means securing together the three registering tabs; and a common means securing together the registering flanges, and the rearward extension of the nose skin, at top and at bottom.

FRANK TERDINA, Jr.